Jan. 20, 1959 V. FINSTON 2,869,560
PROCESSING MACHINE
Filed Sept. 27, 1955 7 Sheets-Sheet 1

Fig. 1

Inventor
VICTOR FINSTON

Jan. 20, 1959    V. FINSTON    2,869,560
PROCESSING MACHINE

Filed Sept. 27. 1955    7 Sheets-Sheet 2

Inventor
VICTOR FINSTON

United States Patent Office 2,869,560
Patented Jan. 20, 1959

2,869,560
PROCESSING MACHINE

Victor Finston, Chicago, Ill., assignor to The Meaker Company, Chicago, Ill., a corporation of Illinois Application September 27, 1955, Serial No. 536,866

17 Claims. (Cl. 134—70)

This invention relates to a processing machine, particularly to an apparatus for automatically conveying and immersing articles in a series of electroprocessing treatment baths.

It is an important object of this invention to provide a novel processing apparatus in which articles are carried horizontally through treatment baths, and are successively elevated for transfer between baths.

It is another object of this invention to provide a novel fully automatic electroprocessing apparatus in which a common elevator receives article carriers at the end of each treatment bath for contemporaneous transfer to the next following bath.

It is a further object of this invention to provide a novel automatic processing apparatus having a reduced over-all length for a given number of treatment stations.

It is a still further object to provide conveying apparatus accommodating treatment tanks of reduced length with consequent important savings in material costs for tank linings and the like.

It is also an object of this invention to provide an electric control system for alternately operating the conveyor and the elevator to raise and lower and intermittently advance a succession of articles by predetermined steps.

The specific nature of the invention as well as other objects and advantages thereof will become apparent to those skilled in the art from the following detailed description of the accompanying sheets of drawings which, by way of preferred example only, illustrate one specific embodiment of the invention.

Figure 1:
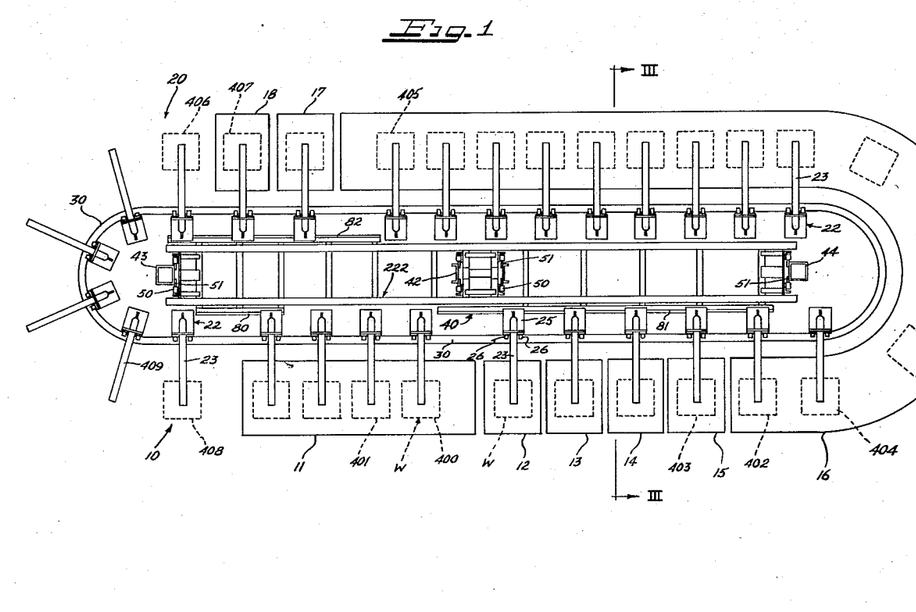
Figure 1 is a somewhat diagrammatic plan view of an overall machine in accordance with the present invention.
Figure 2:
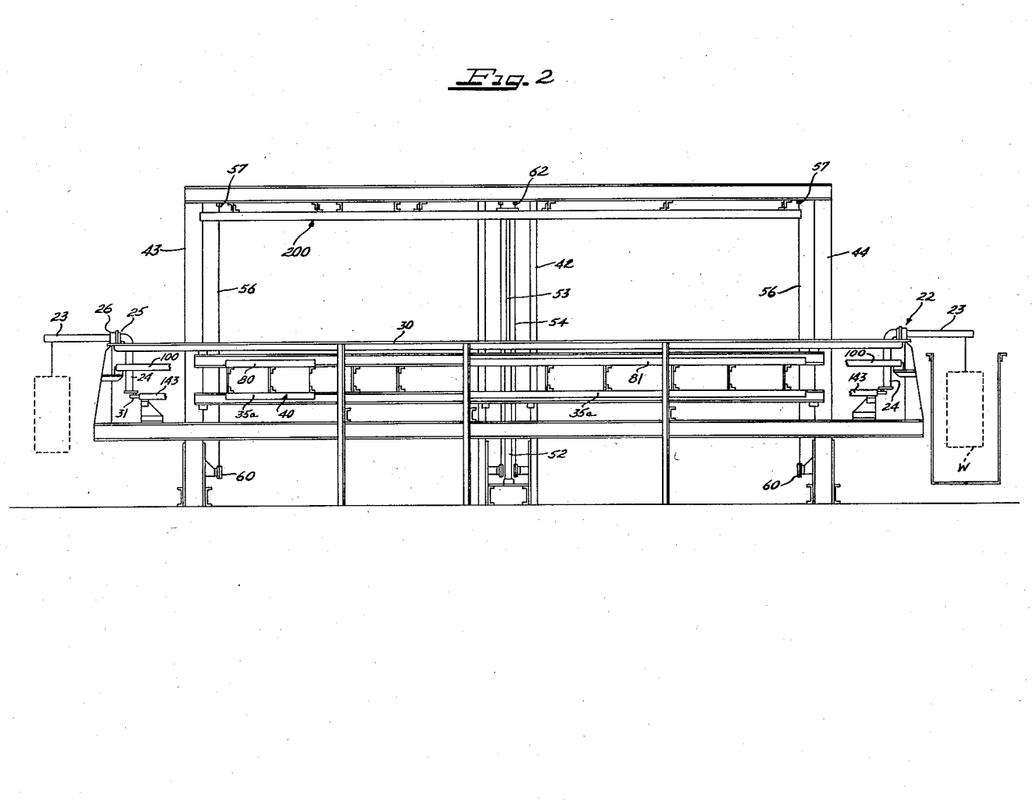
Figure 2 is a somewhat diagrammatic fragmentary side elevational view of the overall machine.

Figure 1 illustrates the over-all arrangement of the apparatus of the present invention which includes a load station 10, an elongated soak clean tank 11, rinse tanks 12 and 13, acid dip tank 14, rinse tank 15, arcuate elongated zinc plating tank 16, rinse tank 17, rinse tank 18 and unload station 20. A plurality of work carriers 22 are moved by the apparatus to transport articles to be treated through the successive tanks.

Figure 3:
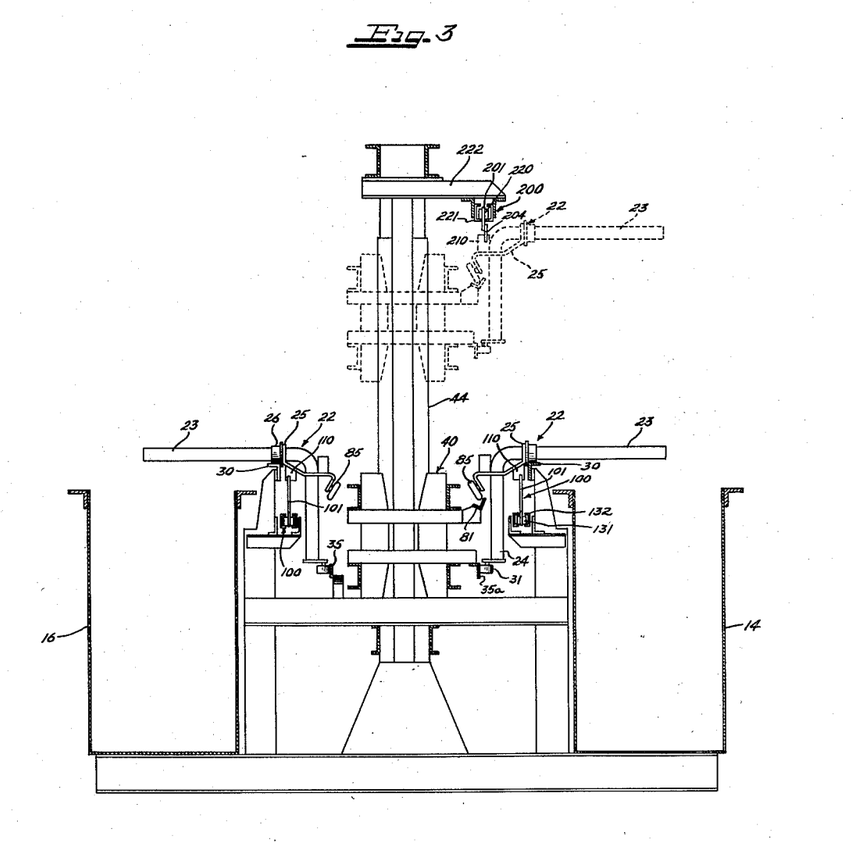
Figure 3 is a vertical cross sectional view taken generally on the line III—III of Figure 1.

As seen in Figure 3, the work carriers 22 are of the side arm type each including a horizontally extending arm 23 for supporting work W centrally of the tanks and a depending arm 24. A carrier body 25, Figure 1, mounts horizontal rollers 26 on either side of the horizontal arm 23 for riding on a horizontal track 30 which extends in a loop about the central framework of the machine. A vertical roller 31, Figure 3, at the lower end of each depending arm 24 engages a vertical track 35 extending in a loop coextensively with the rail 30. The work carriers 22 are advanced horizontally along the rail 30 with the work immersed in the elongated tanks 11 and 16, but are simply dipped into the shorter tanks 12 to 15, 17 and 18 while supported on the rails 30 and 35 without any horizontal advancement.

Figure 4:
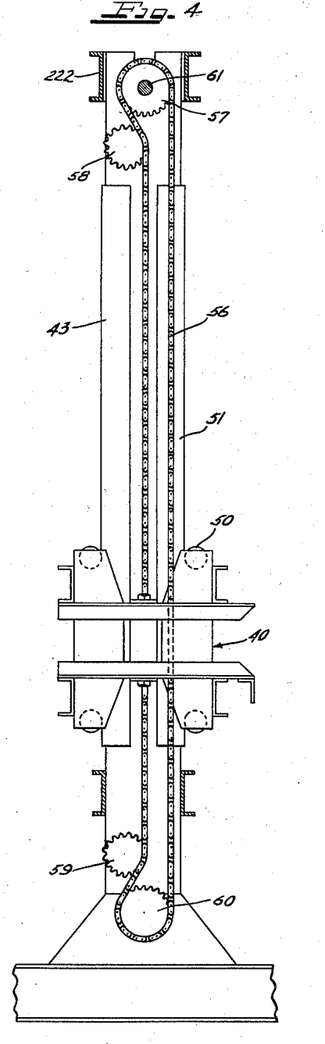
Figure 4 is a fragmentary vertical sectional view taken transversely of the length of the machine at an end column of the machine and illustrating the chain loops mounting the ends of the elevator structure.
Figure 5:
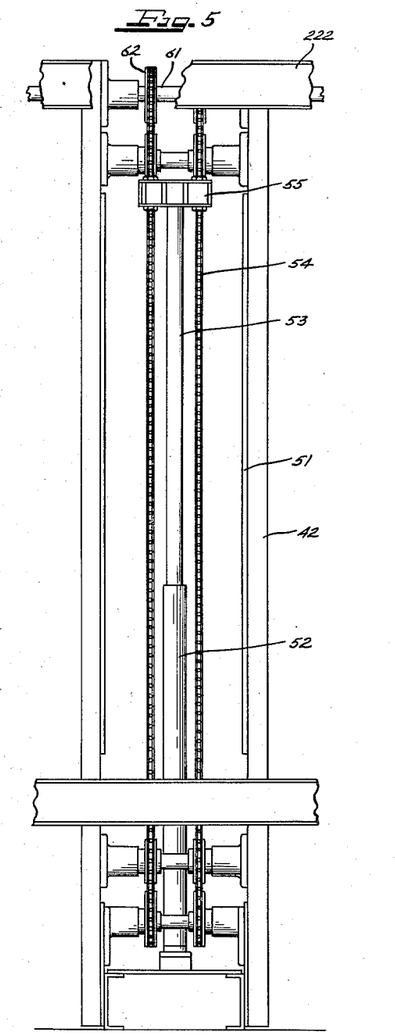
Figure 5 is a fragmentary enlarged elevational view of the structure at the center column of the machine including the elevating cylinder and piston and chain loops for raising the elevator frame.

For elevating the work carriers to transfer the work between tanks, an elongated elevator frame 40 extends the length of the machine centrally of the tanks and is mounted for vertical reciprocation on a vertical center column 42 and on vertical columns 43 and 44 at the respective ends of the machine. As illustrated in Figure 1, the elevator frame 40 may carry rollers such as 50 riding on tracks 51 on the vertical columns for guiding the vertical reciprocation of the elevator frame 40. The frame may be raised and lowered by any suitable hydraulic or electric power means such as hydraulic cylinder 52 having its piston 53 connected to chain loops 54 by means of clevis bracket 55 as illustrated in Figure 5. The chain loops 54 are connected to the elevator frame 40 in the same manner as illustrated in Figure 4 for end chain loops 56, and chain loops 54 and 56 are guided over sprockets such as illustrated at 57—60 in Figure 4.

A suitable line shaft 61 may connect the sprockets such as 62 of the center column and sprockets 57 of the end columns to synchronize the raising of the elevator frame over the entire length of the machine.

For elevating the work carriers to transfer the same between tanks, the elevator frame 40 carries elevator rail sections 80, 81 and 82 for engaging canted rollers 85, Figure 3, secured to the body 25 of the carriers to raise the carriers. Vertical rail portions 35a of vertical rails 35 which are carried by the elevator frame engage rollers 31 when the elevator frame 40 has been raised into engagement with the rollers 85, the vertical track portions 35a of the vertical track 35 being coextensive with the elevator rails 80, 81 and 82.

Figures 6, 7, 8:
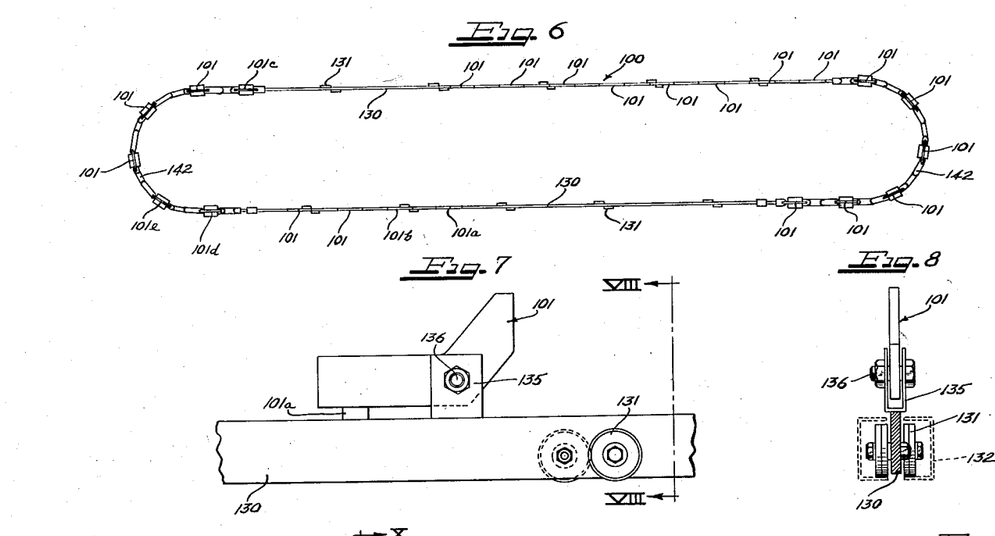
Figure 6 is a diagrammatic view illustrating in plan the lower conveyor mechanism.
Figure 7 is a fragmentary enlarged view of a pusher station on the lower conveyor of Figure 6.
Figure 8 is a vertical cross sectional view taken generally along the line VIII—VIII of Figure 7.
Figure 9:
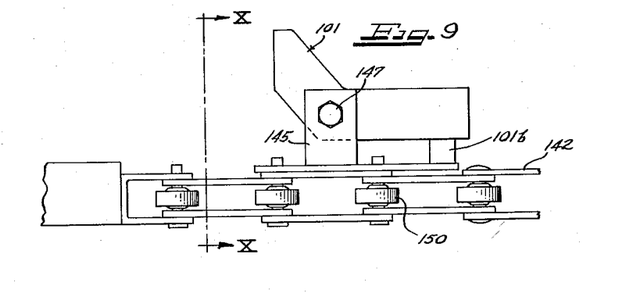
Figure 9 is a fragmentary side elevational view of a further pusher station at a curved portion of the lower conveyor.
Figure 10:
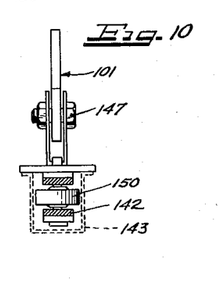
Figure 10 is a fragmentary vertical sectional view taken generally along the line X—X of Figure 9.
Figure 11:
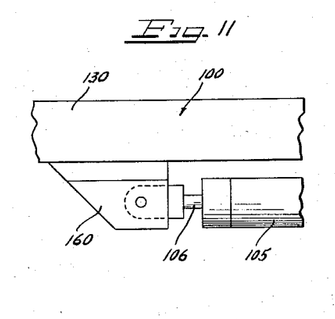
Figure 11 is a fragmentary side elevational view illustrating the hydraulic cylinder and piston for actuating the lower conveyor.

For advancing the carriers in lower positions thereof, when the carriers are adjacent the elongated tanks, a horizontal conveyor 100, Figures 3 and 6, extends in the loop about the entire machine at the inner sides of the tanks and carries pusher lugs 101 at equally spaced intervals adjacent the elongated tanks 11 and 16 and about the curved end of the machine between the last tank 18 and the first tank 11 including the load zone 10 and the unload zone 20. The lower conveyor chain loop 100 may be reciprocated by means of a suitable hydraulic cylinder 105 and piston 106 connected to the chain loop as illustrated in Figure 11. As seen in Figure 3, the lugs 101 are of a height to engage depending lugs 110 carried by a work carrier body 25. As the piston 106 is extended from the cylinder 105, the chain conveyor 100 is advanced a predetermined distance. After the respective work carriers have been raised to elevated position, the piston 106 is retracted to return the lower shuttle to its original position so that the pushers may engage behind the lugs of the next following respective carriers.

As illustrated in Figures 7 and 8, the straight portions of the shuttle 100 comprise shuttle bars 130 having rollers 131 riding along horizontal shuttle tracks 132 indicated in cross section in Figure 8. The shuttle bars carry brackets 135 which mount pushers 101 on pivot shafts 136. The pushers are provided with limit stops 101a limiting pivoting movement of the pushers 101 in the counterclockwise direction by abutment against the bars 130. At the curved portions of the shuttle conveyor, a chain 142 extends in a channel 143 and carries mounting brackets 145 pivotally supporting the pushers 101 by means of pivot bolts 147, blocks 101b limiting the pivotal movement of the pushers 101 in one direction. As indicated in Figure 11 the lower shuttle cylinder 105 has its piston 106 connected to an attachment lug 160 depending from the shuttle bar 130. The flexible conveyor sections 142 may carry rollers 150 rotatable on vertical axes and riding on the sides of channel guide 143.

Figure 12:
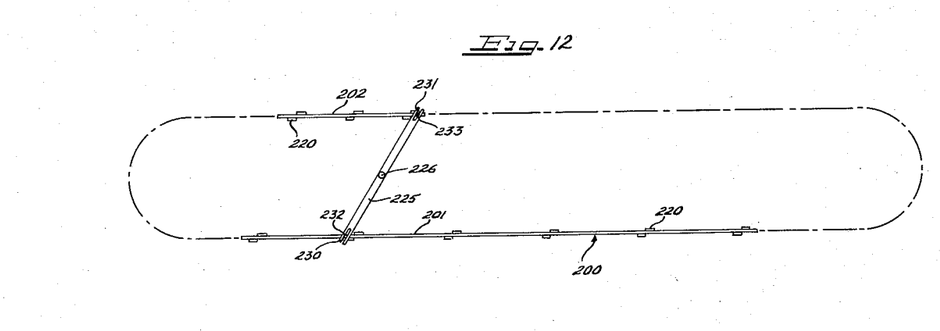
Figure 12 is a diagrammatic view illustrating the upper conveyor shuttle mechanism.
Figure 13:
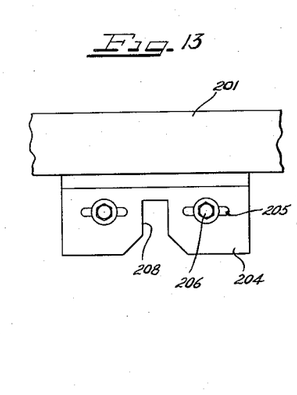
Figure 13 is an enlarged fragmentary view of a pusher station on the upper conveyor.
Figure 14:
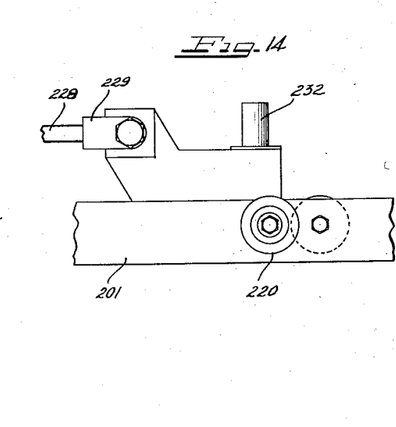
Figure 14 is a fragmentary side elevational view illustrating the connection of the actuating piston to the upper shuttle mechanism.

For advancing the work units between tanks in upper position of the elevator frame, an upper shuttle conveyor 200, Figures 12–14, is provided having a pair of shuttle bars 201 and 202 carrying pusher bars 204 which are longitudinally adjustable by means of slots 205 and clamp bolts 206 relative to the shuttle bars. The pusher bars have a central recess 208 for receiving lugs 210, Figure 3, carried by the work carrier bodies 25 and projecting upwardly therefrom. The shuttle bars carry spaced rollers 220 for riding in tracks 221, Figure 3, carried by the upper framework 222 of the machine. As seen in Figure 12, the upper shuttle bars 201 and 202 are reciprocated by means of a yoke 225 pivoted at 226 and driven by means of a hydraulic cylinder 227 (Figure 15) and piston 228, Figure 14, the piston engaging a clevis bracket 229 secured to the shuttle bar 201 as illustrated in Figure 14, and the yoke having slots 230 and 231 receiving pins 232 and 233 carried on the shuttle bars as illustrated in Figure 12.

ELECTRICAL CONTROL CIRCUITS

Figure 15:
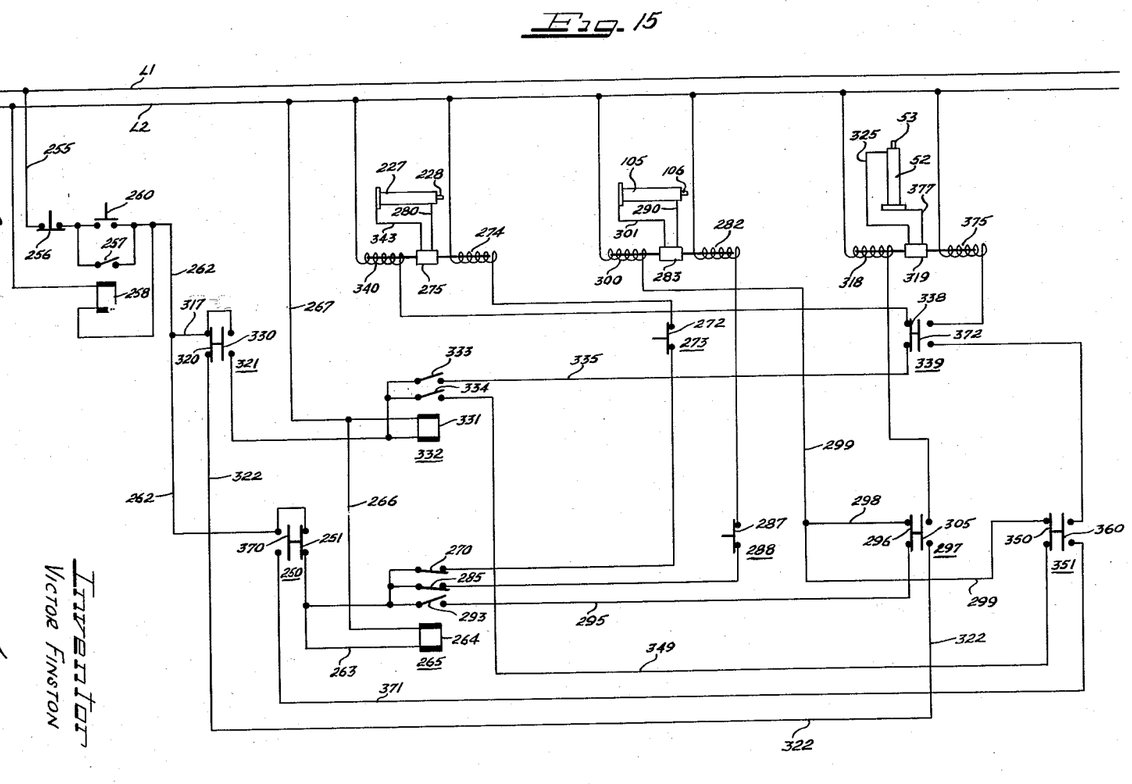
Figure 15 is a diagrammatic illustration of an electric control circuit for the apparatus of Figures 1 to 14.

Referring to Figure 15, the electrical control circuit for the machine will now be understood. Beginning the description of the operating cycle at the point where the elevator frame 40 is being lowered, when the elevator frame reaches its lower position, elevator limit switch 250 has its contact 251 moved to closed position to complete an energizing circuit from line L1 through conductor 255, stop button 256, contact 257 of relay 258 (which is energized by momentarily depressing start button 260), line 262, contact 251, line 263, energizing coil 264 of timing relay 265, and lines 266 and 267 to supply line L2. The timing relay 265 now starts to time out to control the time the work units are immersed in the respective tanks before a new cycle is initiated.

Closure of limit switch contact 251 of elevator limit switch 250 also energizes the upper and lower conveyors to return the same by means of the following circuits:

Supply line L1, line 255, stop button 256, contact 257, line 262, contact 251, contact 270 of timer relay 265, contact 272 of upper conveyor limit switch 273, reverse coil 274 of solenoid valve 275 and line L2.

Energization of the reverse coil 274, causes fluid to be supplied to the front end of the cylinder 227 by means of hydraulic line 280 to retract the piston 228.

Similarly, reverse winding 282 of solenoid valve 283 for the bottom conveyor cylinder 105 is energized through a circuit extending from line L1, stop button 256, contact 257, contact 251, line 262, contact 251, contact 285 of timing relay 265, contact 287 of lower conveyor limit switch 288, coil 282 and line L2. This supplies hydraulic fluid to the hydraulic line 290 leading to the forward end of the cylinder 105 to retract the piston 106 connected to the lower conveyor.

Figure 15 illustrates the condition of the circuit before the timer 265 has timed out. After timer 265 times out contacts 270 and 285 are opened and a contact 293 is closed. The lower conveyor is now energized for an advance by means of the following circuit:

Line L1, line 262, contact 251 of elevator limit switch 250, contact 293, line 295, contact 296 of lower conveyor mid position limit switch 297, conductors 298 and 299, forward coil 300 of bottom conveyor solenoid 283 and line L2.

This shifts the solenoid valve 283 to supply hydraulic fluid to the hydraulic line 301 to extend the piston 106 of cylinder 105 and advance the lower conveyor.

When the lower conveyor has completed its advance to the mid position, a distance of about nine inches, contact 305 of mid position limit switch 297 is closed to energize the "up" coil 318 of solenoid valve 319 for the elevator cylinder 52. The circuit for "up" coil 318 extends from line L1 through line 262, line 317, contact 320 of elevator limit switch 321, conductor 322, contact 305 of mid position limit switch 297, coil 318, and line L2. Energization of coil 318 actuates solenoid valve 319 to supply hydraulic fluid under pressure to hydraulic line 325 to retract the piston 53 into cylinder 52 and raise the elevator frame.

When the elevator reaches its upper position, limit switch 321 is actuated to open contact 320 and close a contact 330 to energize coil 331 of relay 332 and close contacts 333 and 334 thereof. Under this condition, the upper conveyor begins advancing by means of the following circuit:

Line L1, lines 262 and 317, contact 330 of elevator limit switch 321, contact 333 of relay 332, line 335, contact 338 of upper conveyor forward position limit switch 339, forward coil 340 of upper conveyor solenoid valve 275 and line L2.

Solenoid valve 275 thus causes hydraulic fluid under pressure to be supplied to hydraulic line 343 to extend the piston 228 from cylinder 227. At the same time, the lower conveyor is advanced from its mid position to its forward position by means of the following circuit:

Line L1, lines 262 and 317, contact 330, contact 334 of relay 332, line 349, contact 350 of lower conveyor forward position limit switch 351, line 299, forward coil 300 of lower conveyor solenoid valve 283 and line L2.

Solenoid valve 283 then again supplies fluid under pressure to hydraulic line 301 to extend the piston from cylinder 105 to continue the advance of the lower conveyor.

When the lower conveyor reaches its forward position, forward position limit switch 351 is actuated to open contact 350 and close contact 360 to begin lowering the elevator by means of the following circuit:

Line L1, line 262, contact 370 of elevator limit switch 250, line 371, contact 360 of forward position limit switch 351, contact 372 of upper conveyor forward position limit switch 339, "down" coil 375 of elevator solenoid 319 and line L2.

Solenoid valve 319 now supplies hydraulic fluid to hydraulic line 377 to extend the piston 53 of elevator cylinder 52. When the elevator reaches its lower position, timing relay 264 is again energized to begin a new cycle.

Operation

Referring to Figure 1, the work units in the soak clean tank 11 may be separated at their centers by a distance of 1 foot, 4 inches, and the separation between the fourth work unit 400 in tank 11 and the center of the rinse tank 12 may be 2 feet, 5 inches. Thus, after an advance of the work unit 400 a distance of nine inches as the lower conveyor moves to its mid position, there remains a transfer distance of 1 foot, 8 inches between the center of work unit 400 and the center of the rinse tank 12. A lug 204 of the upper conveyor shuttle 201 in Figure 12 is disposed to have its notch 208 coincide with the center of work unit 400 after work unit 400 has been advanced nine inches. The upper conveyor has a stroke of 1 foot, 8 inches so that upon advance of the upper conveyor, the work unit 400 in upper position would then be moved to coincide with the center of rinse tank 12. The pusher 101a in Figure 6 is shown in position to engage the carrier for the work 400 and to advance it the requisite nine inches prior to raising of the elevator. The pusher 101b engages the carrier for the work 401 and advances the work 401 first nine inches and then seven inches more to ultimately position the work unit 401 in the position occupied by work unit 400 in Figure 1. In retracted position, the pusher lugs 101 for the lower conveyor may be two inches behind their respective points of engagement with the work carriers so that the total stroke of the lower conveyor may be 1 foot, 6 inches rather than the 1 foot, 4 inch separation between adjacent work units in the tank 11.

At the transfer between the rinse tank 15 and the plating tank 16, the work unit 402 is advanced nine inches, after which the work unit 403 is raised by the elevator frame, the lower conveyor then completes its stroke to move the work unit 402 another seven inches to the position of work unit 404 in Figure 1. Similarly, the work unit 403 is advanced 1 foot, 8 inches by a 1 foot, 8 inch stroke of the upper conveyor to move the work unit 403 into a position overlying the plating tank 16, and the work unit 403 is then lowered into the position occupied by the work unit 402 in Figure 1.

The transfer of the work unit 405 to rinse tank 17 from plating tank 16 is entirely similar to the transfer of the work unit 400 to the rinse tank 12.

At the unload station, the work unit 406 is first advanced 9 inches, after which the work unit 407 in the rinse tank 18 is raised, pusher 101c in Figure 6 now advances work unit 406 another 7 inches while work unit 407 is moved 1 foot, 8 inches by an upper conveyor lug 204, after which the work unit 407 is lowered into the position occupied in Figure 1 by the work unit 406 at the unload position.

At the load end, an incoming work unit 408 is loaded on a carrier at any suitable point such as indicated at 10 and is advanced 9 inches by the lower conveyor 101d while work carrier 409 is advanced a corresponding distance by pusher 101e of Figure 6. Work unit 408 is then raised to upper position and advanced 1 foot, 8 inches while carrier 409 is advanced another 7 inches. Work unit 408 may then be lowered into the forward end of tank 11.

It will be understood that there are no pusher lugs for the lower conveyor overlying the tanks 12, 13, 14, 15, 17 and 18, and that there are no upper pusher lugs overlying tanks 11 and 16 since the work is advanced in lower position in these tanks. Similarly there are no upper pusher lugs at the load and unload curved ends of the machine.

In a manner which will be apparent from the foregoing description each work unit is transferred into tank 11, advanced step-by-step through tank 11 in unison with other work units in tanks 11 and 16, transferred to tanks 12, 13, 14 and 15 in succession, advanced through tank 16, and then dipped in tanks 17 and 18, all the work units adjacent respective end walls being raised and transferred in unison.

Although a specific embodiment of the invention has been here illustrated and described, it will be understood that various modifications may be made in the construction without a departure from the spirit and scope of the invention as indicated by the appended claims.

I claim as my invention:

1. In a processing machine, an elongated processing tank, a framework adjacent said tank, an elongated first rail having a horizontal bearing surface extending along said tank and supported by said framework, a second elongated rail supported by said framework and having a vertical bearing surface below said horizontal bearing surface and extending along said tank, work carriers disposed in spaced relation along said tank and having first rollers with horizontal axes riding on said first rail bearing surface and having second rollers with vertical axes riding on said second rail bearing surface, said work carriers having work supporting arms extending into overlying relation to said tank for supporting work units in series in said tank, the weight of the work units being supported by means of said first rollers and the turning moments exerted on the work carriers by the work units being resisted by engagement of said second rollers with said second rail, a lower horizontally extending conveyor extending along said tank and mounted on said framework for horizontal movement and having pusher lugs carried thereby for engaging respective work carriers upon forward advance of the lower conveyor to advance the work carriers, lower conveyor drive means for advancing said lower conveyor, an elevator frame mounted for vertical movement on said framework and having an elevator rail with an end portion extending adjacent an end portion of said tank, elevator drive means for raising and lowering said elevator frame to move said elevator rail between an upper and a lower position, said work carriers having third rollers for overlying said elevator rail in lower position of the elevator rail and for support by said elevator rail in upper position thereof, an upper horizontally extending conveyor mounted on said framework for horizontal movement and having a lug for engaging a work carrier supported on said elevator rail in upper position thereof, upper conveyor drive means for advancing said upper conveyor to move a work carrier along said elevator rail in upper position thereof to move a work unit carried by the work carrier between a position longitudinally beyond said end portion of said tank and a position overlying said end portion of said tank, and control means operatively connected to said upper and lower conveyor drive means and to said elevator drive means for advancing carriers into, through and out of said tank.

2. In a processing machine, an elongated processing tank, a framework adjacent said tank, an elongated first rail having a horizontal bearing surface extending along said tank and supported by said framework, a second elongated rail supported by said framework and having a vertical bearing surface below said horizontal bearing surface and extending along said tank, work carriers disposed in spaced relation along said tank and having first rollers with horizontal axes riding on said first rail bearing surface and having second rollers with vertical axes riding on said second rail bearing surface, said work carriers having work supporting arms extending into overlying relation to said tank for supporting work units in series in said tank, the weight of the work units being supported by means of said first rollers and the turning moments exerted on the work carriers by the work units being resisted by engagement of said second rollers with said second rail, a lower horizontally extending conveyor extending along said tank and mounted on said framework for horizontal movement and having pusher lugs carried thereby for engaging respective work carriers upon forward advance of the lower conveyor to advance the work carriers, lower conveyor drive means for advancing said lower conveyor, an elevator frame mounted for vertical movement on said framework and having an elevator rail with an end portion extending adjacent an end portion of said tank, elevator drive means for raising and lowering said elevator frame to move said elevator rail between an upper and a lower position, said work carriers having third rollers for overlying said elevator rail in lower position of the elevator rail and for support by said elevator rail in upper position thereof, an upper horizontally extending conveyor mounted on said framework for horizontal movement and having a lug for engaging a work carrier supported on said elevator rail in upper position thereof, upper conveyor drive means for advancing said upper conveyor to move a work carrier along said elevator rail in upper position thereof to move a work unit carried by the work carrier between a position longitudinally beyond said end portion of said tank and a position overlying said end portion of said tank, and control means operatively connected to said upper and lower conveyor drive means and to said elevator drive means for cyclically energizing said lower conveyor drive means to advance said lower conveyor a first part of its stroke, said elevator drive means to raise said elevator rail to upper position, said lower conveyor drive means to complete the advance of said lower conveyor and said upper conveyor drive means to advance said upper conveyor, and said elevator drive means to lower said elevator rail to lower position.

3. In a processing machine, an elongated processing tank, a framework adjacent said tank, an elongated first rail having a horizontal bearing surface extending along said tank and supported by said framework, a second elongated rail supported by said framework and having a vertical bearing surface below said horizontal bearing surface and extending along said tank, work carriers disposed in spaced relation along said tank and having first rollers with horizontal axes riding on said first rail bearing surface and having second rollers with vertical axes riding on said second rail bearing surface, said work carriers having work supporting arms extending into overlying relation to said tank for supporting work units in series in said tank, the weight of the work units being supported by means of said first rollers and the turning moments exerted on the work carriers by the work unit being resisted by engagement of said second rollers with said second rail, a lower horizontally extending conveyor extending along said tank and mounted on said framework for horizontal reciprocation and having pusher lugs carried thereby for engaging respective work carriers upon forward advance of the lower conveyor to advance the work carriers, the pusher lugs being pivotal to an inoperative position to ride under the next following work carrier during retraction of said lower conveyor, means for moving said pusher lugs into operative position prior to each advance of the work units by said lower conveyor, lower conveyor drive means for reciprocating said lower conveyor, an elevator frame mounted for vertical reciprocation on said framework and having an elevator rail with an end portion extending adjacent an end portion of said tank, elevator drive means for raising and lowering said elevator frame to move said elevator rail between an upper and a lower position, said work carriers having third rollers for overlying said elevator rail in lower position of the elevator rail and for support by said elevator rail in upper position thereof, an upper horizontally extending conveyor mounted on said framework for horizontal reciprocation and having a lug for engaging a work carrier supported on said elevator rail in upper position thereof, upper conveyor drive means for advancing said upper conveyor to move a work carrier along said elevator rail in upper position thereof to move a work unit carried by the work carrier between a position longitudinally beyond said end portion of said tank and a position overlying said end portion of said tank, and control means operatively connected to said upper and lower conveyor drive means and to said elevator drive means for cyclically energizing said lower conveyor drive means to advance said lower conveyor a first part of its stroke, said elevator drive means to raise said elevator rail to upper position, said lower conveyor drive means to complete the advance of said lower conveyor and said upper conveyor drive means to advance said upper conveyor, and said elevator drive means to lower said elevator rail to lower position, said control means including a timer means actuated by movement of said elevator frame to lower position to begin a predetermined timing cycle, said timer means being operative upon completion of said timing cycle to initiate a further advance of said lower conveyor to begin a new cycle of said control means.

4. In a processing machine, an elongated processing tank, a framework adjacent said tank, an elongated first rail having a horizontal bearing surface extending along said tank and supported by said framework, an elongated second rail supported by said framework and having a vertical bearing surface below said horizontal bearing surface and extending along said tank, work carriers disposed in spaced relation along said tank and having first rollers with horizontal axes riding on said first rail horizontal bearing surface and having second rollers with vertical axes riding on said second rail vertical bearing surface and having work supporting arms extending into overlying relation to said tank for supporting work units in series in said tank, the weight of the work units being supported by means of said first rollers and the turning moments exerted on the work carriers by the work units being resisted by engagement of said second rollers with said second rail, a lower horizontally extending conveyor extending along said tank and mounted on said framework for horizontal movement and having pusher lugs carried thereby for engaging respective work carriers upon advance of the lower conveyor to advance the work carriers, lower conveyor drive means for advancing said lower conveyor, an elevator frame mounted for vertical movement on said framework and having an elevator rail with an end portion extending adjacent an end portion of said tank, elevator drive means for raising and lowering said elevator frame to move said elevator rail between an upper and a lower position, said work carriers having third rollers for overlying said elevator rail in lower position of the elevator rail and for support by said elevator rail in upper position thereof, an upper horizontally extending conveyor mounted on said framework for horizontal movement and having a lug for engaging a work carrier supported on said elevator rail in upper position thereof, and upper conveyor drive means for advancing said upper conveyor to move a work carrier along said elevator rail in upper position thereof to move a work unit carried by the work carrier between a position longitudinally beyond said end portion of said tank and a position overlying said end portion of said tank, said elevator frame carrying portions of said second rail vertically aligned with said elevator rail for engaging the second rollers of the carriers as they are moved along said elevator rail in upper position thereof.

5. In a processing machine, an elongated processing tank, a framework adjacent said tank, elongated rail means extending along said tank and supported by said framework, work carriers disposed in spaced relation along said first tank and supported by said rail means for movement of work units supported thereby through said tank, a horizontally extending conveyor extending along said tank and mounted on said framework for engagement with said work carriers when the work carriers are supported on said rail means to advance said work carriers along said rail means and thus to move the work units carried thereby through said tank, conveyor drive means for advancing said lower conveyor, an elevator frame mounted for vertical movement on said framework and having an elevator rail extending adjacent a portion of said tank, elevator drive means for raising and lowering said elevator frame to move said elevator rail between an upper and a lower position, said work carriers having means for overlying said elevator rail in lower position of said elevator rail when the work carriers are moved into vertical alignment with the elevator rail, said overlying means being movable along said elevator rail in upper position of the elevator rail, an upper horizontally extending conveyor mounted on said framework for engaging a work carrier supported by said overlying means on said elevator rail in upper position of said elevator rail, upper conveyor drive means for advancing said upper conveyor to move a work carrier along said elevator rail in upper position thereof to move a work unit carried by the work carrier at a level above said tank, and control means operatively connected to upper and lower conveyor drive means and to said elevator drive means for cyclically energizing said lower conveyor drive means to advance said lower conveyor a first part of its stroke, said elevator drive means to raise said elevator rail to upper position, said lower conveyor drive means to complete an advancing stroke of said lower conveyor and said upper conveyor drive means to advance said upper conveyor, and said elevator drive means to lower said elevator rail to lower position.

6. In a processing machine, a series of tanks including a long tank and a short tank, a framework adjacent said tanks, elongated rail means extending along said tanks and supported by said framework, work carriers disposed in spaced relation along said rail means and supported thereby with work units thereof disposed in said tanks, said work carriers having work in said long tank being movable along said rail means to move their work units in said tank, a lower horizontally extending conveyor extending along said long tank and mounted on said framework for horizontal movement and having pusher lugs carried thereby for engaging the respective work carriers having work units in said long tank to advance the work carriers, lower conveyor drive means for advancing said lower conveyor, an elevator frame mounted for vertical movement on said framework and having an elevator rail extending along said short tank and extending along an end portion of said long tank, elevator drive means for raising and lowering said elevator frame to move said elevator rail between an upper and a lower position, said work carriers having means thereon overlying said elevator rail in lower position thereof when vertically aligned with said elevator rail and for support by said elevator rail in upper position of the elevator rail for movement of the work carriers with the work units thereof above said tanks, an upper horizontally extending conveyor mounted on said framework for horizontal movement and having a lug disposed over said short tank for engaging a work carrier supported on said elevator rail in upper position of the elevator rail above said short tank, upper conveyor drive means for advancing said upper conveyor to move a work carrier along said elevator rail in upper position thereof from a position over said short tank to a position over said end portion of said long tank, and control means operatively connected to said upper and lower conveyor drive means and to said elevator drive means for cyclically energizing said lower conveyor drive means to advance said lower conveyor, said elevator drive means to raise said elevator rail to upper position, said upper conveyor drive means to advance said upper conveyor, and said elevator drive means to lower said elevator rail to lower position, said control means including timer means actuated by movement of said elevator frame to lower position to begin a predetermined timing cycle, and operative upon completion of said timing cycle to initiate a further advance of said lower conveyor.

7. In a processing machine, a series of tanks including a long tank and a short tank, a framework extending along said tanks, elongated rail means extending along said tanks and supported by said framework, work carriers disposed in spaced relation along said rail means and supported thereby with work units thereof disposed in said tanks, said work carriers having work in said long tank being movable along said rail means to move their work units in said tank, a lower horizontally extending conveyor extending along said long tank and mounted on said framework for horizontal movement and having pusher lugs carried thereby for engaging the respective work carriers having work units in said long tank to advance the work carriers, lower conveyor drive means for advancing said lower conveyor, an elevator frame mounted for vertical movement on said framework and having an elevator rail extending along said short tank and extending adjacent an end portion of said long tank, elevator drive means for raising and lowering said elevator frame to move said elevator rail between an upper and a lower position, said work carriers having means thereon for support by said elevator rail in upper position of the elevator rail for movement of the work carriers with the work units thereof above said tanks, an upper horizontally extending conveyor mounted on said framework for horizontal movement and having a lug disposed over said short tank for engaging a work carrier supported on said elevator rail in upper position of the elevator rail above said short tank, and upper conveyor drive means for advancing said upper conveyor to move a work carrier along said elevator rail in upper position thereof from a position over said short tank to a position over said end portion of said long tank.

8. In a processing machine, a series of tanks arranged in generally the form of a loop including a first series of short tanks, an elongated tank and a second series of short tanks longitudinally beyond said long tank, a framework extending within the loop, elongated rail means carried by said framework and extending about a major portion of said loop inwardly of said series of tanks, work carriers disposed in spaced relation along said elongated rail means and supported thereby with work units of the work carriers immersed in the respective tanks, a lower horizontally extending conveyor extending in a loop at the inner side of said tanks and mounted on said framework for horizontal reciprocation and having pusher lugs carried thereby adjacent said long tank at spaced intervals corresponding to the spacing between successive work carriers adjacent the long tank for engaging respective work carriers having work in said long tank upon forward advance of said lower conveyor to advance the work units in said long tank, lower conveyor drive means for reciprocating said lower conveyor, an elevator frame mounted centrally of said loop of tanks for vertical movement on said framework and having elevator rail sections extending across the ends of the tanks for transferring work carriers across the ends of the tanks, and elevator drive means for raising said elevator frame to elevate work units above the ends of the tanks, upper conveyor means comprising a pair of straight tracks overlying respectively said first and second series of short tanks and disposed at opposite straight sides of said loop, a pair of straight bars having rollers riding on the respective tracks and having lugs for engaging work carriers on the elevator rail sections in upper position thereof, and upper conveyor drive means for reciprocating said bars to advance the work carriers along said elevator rail sections including a cross head pivotally carried by said framework and connecting said bars for joint movement.

9. In a processing machine, a series of tanks arranged in generally the form of a loop including a first series of short tanks, an elongated tank and a second series of short tanks longitudinally beyond said long tank, a framework extending within the loop, elongated rail means carried by said framework and extending about a major portion of said loop inwardly of said series of tanks, work carriers disposed in spaced relation along said elongated rail means and supported thereby with work units of the work carriers immersed in the respective tanks, a lower horizontally extending conveyor extending in a loop at the inner side of said tanks and mounted on said framework for horizontal reciprocation and having pusher lugs carried thereby adjacent said long tank at spaced intervals corresponding to the spacing between successive work carriers adjacent the long tank for engaging respective work carriers having work in said long tank upon forward advance of said lower conveyor to advance the work units in said long tank, lower conveyor drive means for reciprocating said lower conveyor, an elevator frame mounted centrally of said loop of tanks for vertical movement on said framework and having elevator rail sections extending across the ends of the tanks for transferring work carrier across the ends of the tanks, and elevator drive means for raising said elevator frame to elevate work units above the ends of the tanks, said elongated tank being of length to receive a predetermined number of equally spaced work units therein and having an additional extent to accommodate movement of all of the work a distance less than the spacing between centers of adjacent work units therein, said elongated tank being too short to accommodate movement of the work units a center-to-center distance equal to the spacing between centers of adjacent work units until one of the work units has been raised above an end wall of the tank by an elevator rail section of said elevator frame, control means controlling said lower conveyor drive means to advance said lower conveyor a part only of said center-to-center distance between adjacent work units and then to stop, controlling said elevator drive means to raise said elevator frame in response to the partial advance of said lower conveyor, and controlling said lower conveyor drive means to complete the advance of said lower conveyor in response to said elevator frame reaching its upper position, and upper conveyor means mounted on said framework for advancing work carriers on the elevator rail sections in raised position of the elevator frame to transfer work units between tanks.

10. In a processing machine, a series of tanks arranged in generally the form of a loop including a first series of short tanks, an elongated tank and a second series of short tanks longitudinally beyond said long tank, a framework extending within the loop, elongated rail means carried by said framework and extending about a major portion of said loop inwardly of said series of tanks, work carriers disposed in spaced relation along said elongated rail means and supported thereby in operative relation to the respective tanks, conveyor means carried by said framework and operative to advance the carriers adjacent said elongated tank along said rail means, conveyor drive means for advancing said conveyor means, an elevator frame mounted centrally of said loop of tanks for vertical movement on said framework and having elevator rail sections extending across the ends of the tanks for elevating work carriers for transfer between adjacent tanks, and elevator drive means for raising and lowering said elevator frame, said elongated tank being of length to receive a predetermined number of equally spaced work units therein and having an additional extent to accommodate movement of all of the work units a distance less than the spacing between centers of adjacent work units therein, said elongated tank being too short to accommodate movement of said predetermined number of work units a center-to-center distance equal to the spacing between centers of adjacent work units, and control means controlling said conveyor drive means to advance said conveyor means a part only of said center-to-center distance between adjacent work units and then to stop, controlling said elevator drive means to raise said elevator frame in response to the partial advance of said conveyor means, and controlling said conveyor drive means to complete the advance of said conveyor means in response to said elevator frame reaching its upper position.

11. In a processing machine for moving work carriers through a series of processing stations arranged in an elongated loop, a framework for disposition centrally of said loop, elongated rail means supported in fixed relation on said framework and comprising fixed rail portions extending on respective opposite sides of said framework for supporting the work carriers at respective processing stations on each side of the loop, lower conveyor means mounted on respective opposite sides of said framework for horizontal movement in respective opposite directions on opposite sides of the framework at a fixed lower level and disposed to engage the work carriers on said rail portions and advance the carriers between processing stations in a predetermined direction about said loop, elevator means mounted on said framework for vertical reciprocation between a lower position and an upper position and having horizontally extending elevator rail sections disposed to lift work carriers at certain of said processing stations and to support the work carriers in upper position of the elevator means for transfer to succeeding work stations, and upper conveyor means mounted on said framework for horizontal movement at a fixed upper level and disposed for detachable engagement with work carriers on said elevator rail sections in upper position of the elevator means to advance the elevated work carriers along said elevator rail sections.

12. In a processing machine for moving work units through a series of processing stations, a framework for disposition adjacent the series of processing stations, elongated fixed rail means carried in fixed relation on said framework comprising a first fixed length of horizontal rail extending for the length of said series of stations and a second fixed length of horizontal rail extending parallel with and below the first length of rail and having a gap therein adjacent one of said series of processing stations, a series of work carriers having first and second means for riding on said first and second fixed rail lengths respectively to support work units at the respective processing stations, elevator means mounted on said framework for vertical reciprocation between an upper position and a lower position and having elevator rail means adjacent said one processing station comprising a first elevator rail section extending horizontally adjacent said one processing station and a second elevator rail section for disposition in the gap in said second fixed rail length to engage said second means of a work carrier adjacent said one station, and said work carriers having third means for engagement by said first elevator rail section to lift the work carrier adjacent said one station off said fixed rail means and to support the work carrier for movement along said first and second elevator rail sections in upper position of the elevator means, and means carried on said framework for advancing work carriers along said fixed rail means and said elevator rail means to move the work carriers through the series of processing stations.

13. In a processing machine for moving work carriers through a series of processing stations arranged in an elongated loop, a framework for disposition centrally of said loop, elongated rail means supported in fixed relation on each side of said framework and comprising straight rail portions extending generally in parallel relation on respective opposite sides of said framework for supporting the work sarriers at respective processing stations on each side of the loop, lower conveyor means extending in the form of a closed loop about said framework and mounted on said framework for horizontal movement at a fixed lower level, said lower conveyor means having pusher means for engaging work carriers on said elongated rail means to advance carriers between successive processing stations, an elongated elevator frame extending for the length of said framework and mounted on said framework for vertical reciprocation between a lower position and an upper position, said elevator frame having horizontally extending elevator rail sections at the opposite sides thereof and disposed to lift the work carriers adjacent predetermined processing stations and to support the work carriers in upper position of the elevator frame for transfer between processing stations, upper conveyor means mounted on said framework for horizontal reciprocating movement at a fixed upper level and having pusher means disposed for detachable engagement with work carriers on said elevator rail sections when the elevator frame reaches its upper position to advance the elevated work carriers along said elevator rail sections, and upper conveyor drive means for reciprocating said upper conveyor means to advance the elevated work carriers.

14. In a processing machine for moving work units through a series of processing stations, a framework adjacent said series of stations, elongated first rail means mounted on said framework and having a first bearing surface extending along said series of stations, elongated second rail means mounted on said framework and having a second bearing surface below said first bearing surface and extending along said series of stations, work carriers disposed in spaced relation along said series of stations and having first means riding on said first bearing surface and having second means riding on said second bearing surface and having work supporting arms extending into overlying relation to said series of stations for supporting work units at said stations, said first bearing surface supporting the weight of the work units and said second bearing surface resisting the turning moments exerted on the work carriers by the work units, a lower horizontally extending conveyor extending along said series of stations and mounted on said framework for horizontal movement and having pusher lugs carried thereby for engaging respective work carriers upon advance of the lower conveyor to advance the work carriers, lower conveyor drive means for advancing said lower conveyor, an elevator frame mounted for vertical movement on said framework and having an elevator rail adjacent one of said stations, elevator drive means for raising and lowering said elevator frame to move said elevator rail between an upper and a lower position, said work carriers having third means for overlying said elevator rail in lower position of the elevator rail and for support by said elevator rail in upper position thereof, an upper horizontally extending conveyor mounted on said framework for horizontal movement and having a lug for engaging a work carrier supported on said elevator rail in upper position thereof, and upper conveyor drive means for advancing said upper conveyor to move a work carrier along said elevator rail in upper position thereof.

15. In a processing machine for moving work carriers through processing stations arranged in an elongated loop, a framework for disposition centrally of said loop, elongated rail means supported in fixed relation by said framework and comprising straight rail portions extending generally in parallel relation on respective opposite sides of said framework for supporting work carriers at respective processing stations on each side of the loop entirely from within said loop, lower conveyor means extending horizontally along a series of processing stations and mounted on said framework for horizontal movement at a fixed lower level, said lower conveyor means having pusher lugs carried thereby for detachably engaging respective work carriers having work units at said series of stations to advance the work carriers horizontally through said series of stations at a lower level, lower conveyor drive means for advancing said lower conveyor, an elevator frame mounted for vertical movement on said framework and having elevator rail means for moving work carriers vertically from said series of stations and for supporting work carriers in an upper position thereof, elevator drive means for raising and lowering said elevator frame, said work carriers having means thereon for coupling the carriers to said elevator rail means for vertical movement therewith and for support by said elevator rail means in upper position of the elevator rail means to accommodate movement of the work carriers along said elevator rail means, an upper horizontally extending conveyor mounted on said framework for horizontal movement and having a lug disposed for engaging a work carrier supported on said elevator rail means in upper position of the elevator rail means, and upper conveyor drive means for advancing said upper conveyor to move a work carrier along said elevator rail means.

16. The processing machine of claim 12 wherein said first elevator rail section has a generally V-cross-section and said third means of said work carrier comprises roller means for riding in the groove of said V-cross-section first elevator rail section to support the work carrier against turning movement as well as to support the work carrier vertically in upper position of the elevator means.

17. The processing machine of claim 14 with the elevator frame carrying portions of the second rail means vertically aligned with the elevator rail for engaging the second means of the carriers as they are moved along said elevator rail in upper position thereof.

References Cited in the file of this patent

UNITED STATES PATENTS

| | | |
|---|---|---|
| 2,048,937 | Larson | July 28, 1936 |
| 2,102,308 | Daw | Dec. 14, 1937 |
| 2,299,618 | Finston | Oct. 20, 1942 |
| 2,341,606 | Finston | Feb. 15, 1944 |
| 2,591,681 | Davis | Apr. 8, 1952 |
| 2,591,682 | Davis | Apr. 8, 1952 |
| 2,738,888 | Todd | Mar. 20, 1956 |